(12) United States Patent
Khachaturove et al.

(10) Patent No.: US 7,532,390 B2
(45) Date of Patent: May 12, 2009

(54) SYSTEM FOR RECOVERING INPUT POLARIZATION STATE OF OPTICAL BEAM AT PROPORTIONAL INTENSITY

(75) Inventors: Arkady Khachaturove, Haifa (IL); Uri Voitsechov, Amirim (IL); Avram Matcovitch, Nesher (IL); Sergey Zaslavsky, Qiriat Yam (IL)

(73) Assignee: Bioscan Ltd., Yokneam (IL)

( * ) Notice: Subject to any disclaimer, the term of this patent is extended or adjusted under 35 U.S.C. 154(b) by 39 days.

(21) Appl. No.: 10/558,473

(22) PCT Filed: Feb. 22, 2004

(86) PCT No.: PCT/IL2004/000173
§ 371 (c)(1),
(2), (4) Date: Dec. 18, 2006

(87) PCT Pub. No.: WO2004/077100
PCT Pub. Date: Sep. 10, 2004

(65) Prior Publication Data
US 2007/0183018 A1  Aug. 9, 2007

(30) Foreign Application Priority Data
Feb. 27, 2003 (IL) .................................. 154680

(51) Int. Cl.
*G02F 1/29* (2006.01)
*G02B 5/30* (2006.01)
(52) U.S. Cl. ...................................... 359/301; 359/485
(58) Field of Classification Search ................. 359/301, 359/303, 304, 485, 487, 497
See application file for complete search history.

(56) References Cited

U.S. PATENT DOCUMENTS
5,164,854 A  11/1992  Takanashi et al.

(Continued)

FOREIGN PATENT DOCUMENTS
EP  0 793 079  9/1997

(Continued)

OTHER PUBLICATIONS

Supplementary Partial European Search Report for EP 04 71 3487 dated Aug. 28, 2006.

(Continued)

*Primary Examiner*—William C Choi
(74) *Attorney, Agent, or Firm*—Pearl Cohen Zedek Latzer, LLP

(57) ABSTRACT

A method for recovering an initial linear state of polarization, of an optical beam after the beam has passed through an optical fiber and whose polarization state was disrupted, attaining power which is directly proportional to the power of the beam before it has passed through the optical fiber. The method comprises: splitting the beam into two beams, a first beam with a first polarization state and a second beam with a second polarization state, the second polarization state being orthogonal to the first polarization state; changing the polarization state of the first beam; and combining the first and second beams in half of their intensities into at least one linearly polarized beam. This way a linearly polarized output beam with power that is directly proportional to the power of the beam prior to its passing through the optical fiber is achieved.

4 Claims, 3 Drawing Sheets

U.S. PATENT DOCUMENTS

| | | |
|---|---|---|
| 5,689,359 A | 11/1997 | Kurata et al. |
| 5,701,201 A | 12/1997 | Okazaki et al. |
| 6,177,992 B1 | 1/2001 | Braun et al. |
| 6,427,033 B1 | 7/2002 | Hait |
| 2002/0135874 A1 | 9/2002 | Li |

FOREIGN PATENT DOCUMENTS

| | | |
|---|---|---|
| JP | 56137307 | 10/1981 |
| WO | WO 99/12009 | 3/1999 |
| WO | WO 03/057061 | 7/2003 |

OTHER PUBLICATIONS

International Search Report for PCT/IL04/00173 mailed Dec. 17, 2004.

SYSTEM FOR RECOVERING INPUT POLARIZATION STATE OF OPTICAL BEAM AT PROPORTIONAL INTENSITY

CROSS-REFERENCE TO RELATED APPLICATIONS

This application is a National Phase Application of PCT International Application No. PCT/IL2004/000173, International Filing Date Feb. 22, 2004, claiming priority of IL Patent Application, 154680, filed Feb. 27, 2003.

FIELD OF THE INVENTION

The subject of the invention relates to eliminating distortion in the state of polarization of a polarized optical beam caused by passage through an optical fiber.

BACKGROUND OF THE INVENTION

A polarized optical beam, for example laser output, is exposed to distortions when it is transmitted through an optical fiber. One type of distortion relates to uncontrolled changes that occur in the state of polarization of the optical beam passing through the optical fiber. The state of polarization of the input beam is disrupted by the parasitic effect of the fiber.

A prior art solution for maintaining the state of polarization is to use a special optical fiber that maintains the state of polarization of the light as it passes through the fiber.

A drawback of that solution is the very high cost of the special optical fiber used.

In U.S. 20020135874 (Li), and U.S. Pat. No. 5,164,854 (Takanashi), polarization recovery systems were disclosed where an initial light beam is split into two beams, one of P polarization state and the other in S polarization state. Li suggests this treatment in order to enhance illumination of an LCD imager. Takanashi suggests a converter for randomly-polarized light to linearly polarized light, where the initial light beam is separated into two beams in a first polarization state and a second (orthogonal) polarization state, and changing the second polarization state to a third polarization state which is identical to the first polarization state. Both these treatments are aimed at producing linearly polarized light. They do not suggest nor are capable of recovering initial polarization state of a light beam that was passed through an optical fiber undergoing, as it traverses the fiber, parasitic distortions of its polarization state. Furthermore, they do not combine the two reproduced primary-separated orthogonal polarized beams into a single beam. It is important to note that the above mentioned invention does not deal with sensing of the light processed in these systems, but rather use the light for spatial illumination. The human eye is insensitive for short-term fluctuations in intensity of light it sees (for periods less then 50 milliseconds), whereas the invention of the present invention seeks to provide a system for stabilizing an output light signal for measurement purposes, and hence is concerned with short-term fluctuations much shorter than those mentioned above.

Use of a special fiber can be avoided if the state of polarization is allowed to fluctuate as the beam passes through the fiber, and then reconstructed from the fiber output.

In the present invention the polarization state of the fiber input is recovered from the fiber output using a specially designed device, which produces two beams of equal polarity and equal power.

Therefore, it is a main object of the present invention to provide a method and a system that takes as input an optical beam that has been transmitted through a general-purpose multi-mode or single-mode optical fiber and produces an output beam whose state of polarization is the same (linearly polarized) as that of the optical beam before the optical beam entered the fiber, and whose power is in direct proportion to the input power function versus time.

BRIEF DESCRIPTION OF THE INVENTION

There is thus provided, in accordance with a preferred embodiment of the present invention, a method for recovering an initial linear state of polarization, of an optical beam after the beam has passed through an optical fiber and whose polarization state was disrupted, attaining power which is directly proportional to the power of the beam before it has passed through the optical fiber, the method comprising: splitting the beam into two beams, a first beam with a first polarization state and a second beam with a second polarization state, the second polarization state being orthogonal to the first polarization state; changing the polarization state of the first beam; and combining the first and second beams in half of their intensities into at least one linearly polarized beam, thereby achieving a linearly polarized output beam with power that is directly proportional to the power of the beam prior to its passing through the optical fiber.

Furthermore, in accordance with a preferred embodiment of the present invention, combining of the first and second beams is achieved by way of directing the beams to the combiner using mirrors.

Furthermore, in accordance with a preferred embodiment of the present invention, the second beam is treated to a phase-compensation before the first and second beams are combined.

Furthermore, in accordance with a preferred embodiment of the present invention, there is provided a system for recovering an initial linear state of polarization, of an optical beam after the beam has passed through an optical fiber and whose polarization state was disrupted, attaining power which is directly proportional to the power of the beam before it has passed through the optical fiber, the system comprising: a polarized beam splitter through which the polarized optical beam passes, to create a first beam with a first polarization state and a second beam with a second polarization state, the second polarization state being orthogonal to the first polarization state; a half-wave plate through which the first beam passes, changing the polarization state of the first beam into the second orthogonal polarization state; a combiner for combining the first beam and the second beam in half of their intensities into a single beam, after the polarization state of the second beam has changed, whereby when the system is used at least one linearly polarized beam with power that is directly proportional to the power of the beam prior to its passing through the fiber is achieved.

Furthermore, in accordance with a preferred embodiment of the present invention, the combiner comprises a polarization-preserving beam splitter with equal transparence and reflective ratio.

Furthermore, in accordance with a preferred embodiment of the present invention, one or more mirrors are used to direct the beams into the combiner.

Furthermore, in accordance with a preferred embodiment of the present invention, a phase compensation plate is located on the path of the second beam between the polarization preserving beam splitter and the combiner to compensate for phase shift side effects.

BRIEF DESCRIPTION OF THE FIGURES

The invention is described herein, by way of example only, with reference to the accompanying Figures, in which like components are designated by like reference numerals.

Numbers used in this specification:

| | |
|---|---|
| 6 | power of the optical beam. |
| 7 | power of the P polarization state in the optical fiber |
| 8 | power of the S polarization state in the optical fiber |
| 9 | beam that is output from the apparatus of the present invention. |
| 10 | polarized beam splitter (PBS) |
| 11 | optical fiber |
| 12 | half-wave plate |
| 14 | Mirror |
| 15 | phase compensator |
| 16 | beam combiner |
| 18 | polarity state recovery system |
| 20 | fiber input beam |
| 21 | fiber output with P polarization |
| 22 | fibre output with S polarization |
| 23 | fiber output beam |
| 24 | system output beam A |
| 25 | system output beam B |

DETAILED DESCRIPTION OF THE INVENTION

Figure 1:
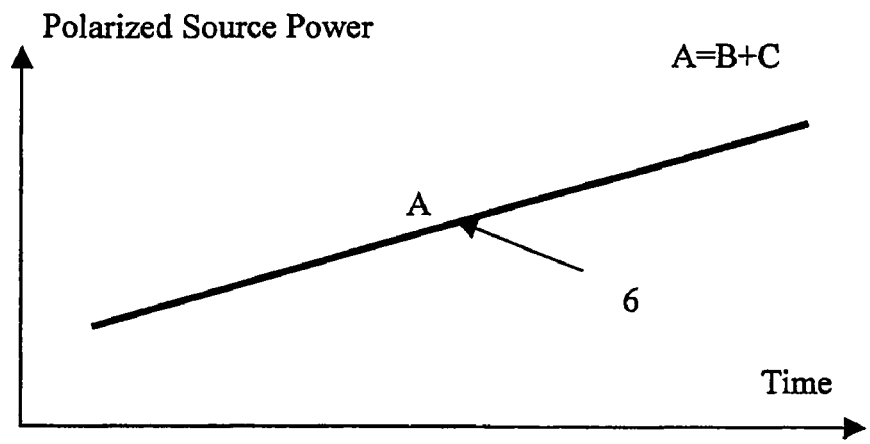
FIG. 1 is a graph of the power function of a linearly polarized optical beam as it enters an optical fiber.
Figure 2:
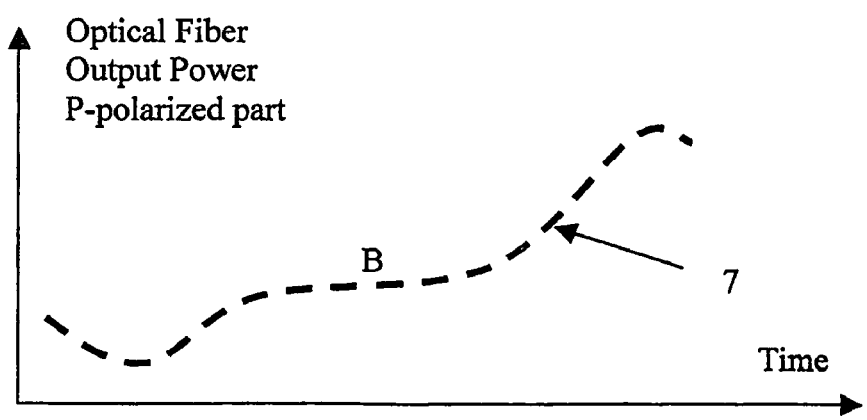
FIG. 2 is a graph of the power function of the P polarization component of an optical beam output from an optical fiber.
Figure 3:
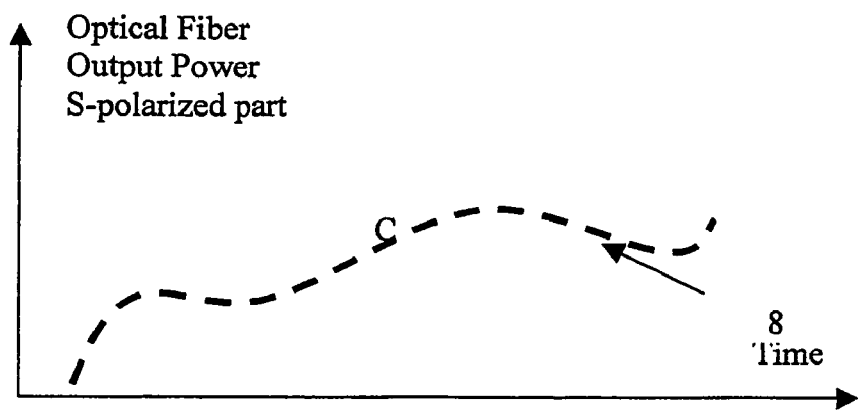
FIG. 3 is a graph of the power function of the S polarization component of an optical beam output from an optical fiber.

With reference to FIGS. 1 to 4, FIG. 1 is a graph of the power of an optical beam as the beam enters an optical fiber. FIG. 2 is a graph of the power of the P polarization state component of fiber output. FIG. 3 is a graph of the power of the S polarization state component of the fiber output. The value of the power of P polarization state component of fiber output and the value of the power of S polarization state component of fiber output are complementary, their sum being constant (equal to the power of the input beam as shown in FIG. 1). This indicates that the two polarization states, P and S, exchange power as they pass through the optical fiber.

The present invention discloses a method and a system for light polarization state recovery taking as input a linearly polarized optical beam that has passed through and emerged from a general-purpose multi-mode or single-mode optical fiber (hereinafter—the fiber output beam). The system achieves a linearly polarized output signal with power that is directly proportional to the power of the signal entering the optical fiber.

The invention is based on taking the fiber output beam whose polarization is in a corrupted state due to the parasitic effect of the optical fiber, splitting the fiber output beam into two orthogonal states of polarization (P & S), changing the state of polarization of one of them (S to P for example), and combining those beams.

Figure 5:
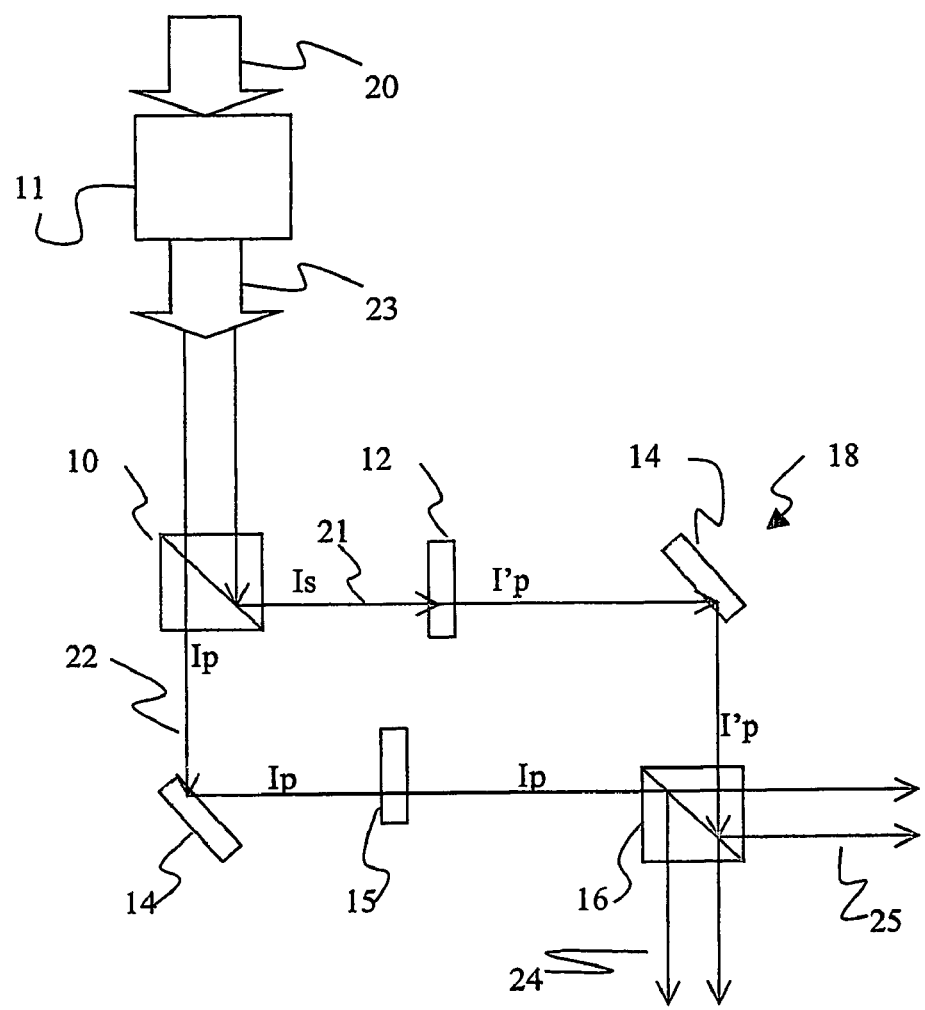
FIG. 5 is a diagram of a preferred embodiment in accordance with the present invention of a system for recovering the input polarization state of a linearly polarized optical beam, after it has passed through an optical fiber, maintaining a power level proportional to the power of the beam when it entered the fiber.

FIG. 5 is a diagram of a preferred embodiment of the present invention. A polarized beam 20 passes through optical fiber 11. Beam 23 has two polarization components P and S, with respective power levels Ip and Is as the result of fiber polarization distortions. As the beam travels through fiber 11, these components continuously exchange luminous energy.

Beam 23 enters the system of the present invention, namely the polarization state recovery system 18.

Polarized beam splitter (PBS) 10 splits randomly polarized input beam 23 into a beam 21 with S polarization state (Is power) and a beam 22 with P polarization state (Ip power).

Beam 21 passes through half-wave plate 12, which turns beam 21 polarization state to P (I'p power) and as a side effect shifts the phase of beam 21.

Beam 21 is then reflected by mirror 14 and enters combiner 16 (which is in fact a polarization preserving beam splitter with equal transparence and reflective ratio (Rs=Ts=50%, Rp=Tp=50%) used in reverse mode, i.e. it combines half of the intensities of each of the two initially separated beams into one combined beam, while preserving their polarization). Due to the symmetrical characteristics of the polarization preserving beam splitter there are in fact two such combined beams).

Meanwhile, beam 22 is reflected by another mirror 14, and optionally passes through phase compensation plate 15, which compensates for the phase shift side effect that half-wave plate 12 caused to beam 21, as well as any differences in path length between beam 21 and beam 22.

Note that phase compensation plate 15 is optional and can be omitted for applications that are not phase-sensitive.

Beam 22 then enters combiner 16, where it is combined with beam 21.

Inside combiner 16 the power of each of the beams 21 and 22 is halved, therefore the output of combiner 16 consists of two equal beams, 23 and 24, each with the same state of polarization and equal power. The powers of the output beams 23 and 24 are directly proportional to the power of the original beam 20 and are not affected by polarization distortion in the fiber 11.

Figure 4:
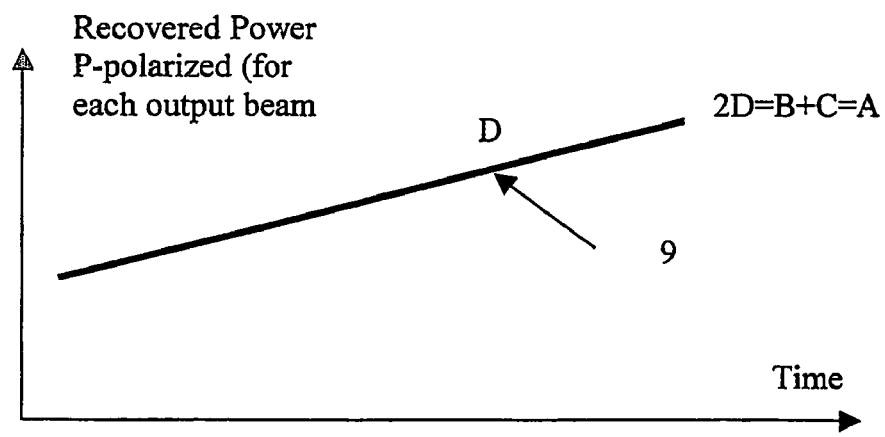
FIG. 4 is a graph of the output power function of a linearly polarized optical beam after the optical fiber input polarization has been recovered from the optical fiber output in accordance with the method and system of the present invention.

FIG. 4 shows the graph of one of this beam pair, which has the same state of polarization as the fiber input beam and has a power level that is directly proportional to the fiber input beam.

Advantageously, the above-described invention accomplishes the object of recovering the state of polarization of the initial beam 20 with power that is directly proportional to the power of the initial beam.

The output of the polarization preserving beam splitter, acting as the combiner in the embodiments described herein, is two orthogonal equal beams with the same linear state of polarization and power. It is possible, in an alternative embodiment to redirect one of those beams to the direction of the other beam, thus in effect receiving a single linearly polarized beam whose power is the sum of the powers of the output beams.

The system of the present invention may be used, for example, in conjunction with the system described in ULTRASONIC TRANSDUCER PROBE, PCT/IL02/00018 (to be published soon). In that system, aimed at obtaining information relating to the physical characteristics of a lumen, a polarized optical beam is passed through an optical fiber, the optical fiber being inserted through the lumen, and picks up fluctuations caused by echoes of ultrasonic signal generated within the lumen. These fluctuations are analyzed to determine parameters such as the cross-section of the lumen. The beam is affected by the parasitic effect of the optical fiber, which changes the state of polarization of the initial information-carrier beam, and the system and method of the present invention facilitate eliminating that effect, while maintaining the desired information carried by the beam, by reconstructing the initial state of polarization of the output beam.

As mentioned hereinabove, Takanashi projects the two primarily separated orthogonally polarized beams onto a planar screen after changing the polarization state of one of the beams to be the same as the others. Therefore Takanashi's invention cannot be applied for space distributed sensing systems, like space-charging photorefractive crystals, due to the planar characteristic of his invention.

It is noted that the embodiments disclosed herein are given for explanatory purposes only and in no way limit the scope of the present invention. The optical elements described may be alternatively replaced by other optical elements, which perform the same tasks.

It should be clear that the description of the embodiments and attached Figures set forth in this specification serves only for a better understanding of the invention, without limiting its scope as covered by the following Claims.

It should also be clear that a person skilled in the art, after reading the present specification could make adjustments or amendments to the attached Figures and above described embodiments that would still be covered by the following Claims.

The invention claimed is:

1. A method for recovering an initial linear state of polarization, of an optical beam after the beam has passed through an optical fiber and whose polarization state was disrupted, attaining power which is directly proportional to the power of the beam before it has passed through the optical fiber, the method comprising: splitting the beam into two beams, a first beam with a first polarization state and a second beam with a second polarization state, the second polarization state being orthogonal to the first polarization state; changing the polarization state of the first beam; and combining the first and second beams in half of their intensities into at least one linearly polarized beam, thereby achieving a linearly polarized output beam with power that is directly proportional to the power of the beam prior to its passing through the optical fiber.

2. The method as claimed in claim 1, wherein combining of the first and second beams is achieved by way of directing the beams to the combiner using mirrors.

3. The method of claim 1, wherein the second beam is treated to a phase-compensation before the first and second beams are combined.

4. A system for recovering an initial linear state of polarization, of an optical beam after the beam has passed through an optical fiber and whose polarization state was disrupted, attaining power which is directly proportional to the power of the beam before it has passed through the optical fiber, the system comprising:

a polarized beam splitter through which the polarized optical beam passes, to create a first beam with a first polarization state and a second beam with a second polarization state, the second polarization state being orthogonal to the first polarization state;

a half-wave plate through which the first beam passes, changing the polarization state of the first beam into the second orthogonal polarization state;

a combiner comprising a polarization-preserving beam splitter with equal transparence and reflective ratio for combining the first beam and the second beam in half of their intensities into a single beam, after the polarization state of the second beam has changed, whereby when the system is used at least one linearly polarized beam with power that is directly proportional to the power of the beam prior to its passing through the fiber is achieved, wherein a phase compensation plate is located on the path of the second beam between the polarization preserving beam splitter and the combiner to compensate for phase shift side effects.

* * * * *